Jan. 13, 1931.  L. GREEN  1,788,391
BALL BEARING SPRING CASTER
Filed Oct. 6, 1927
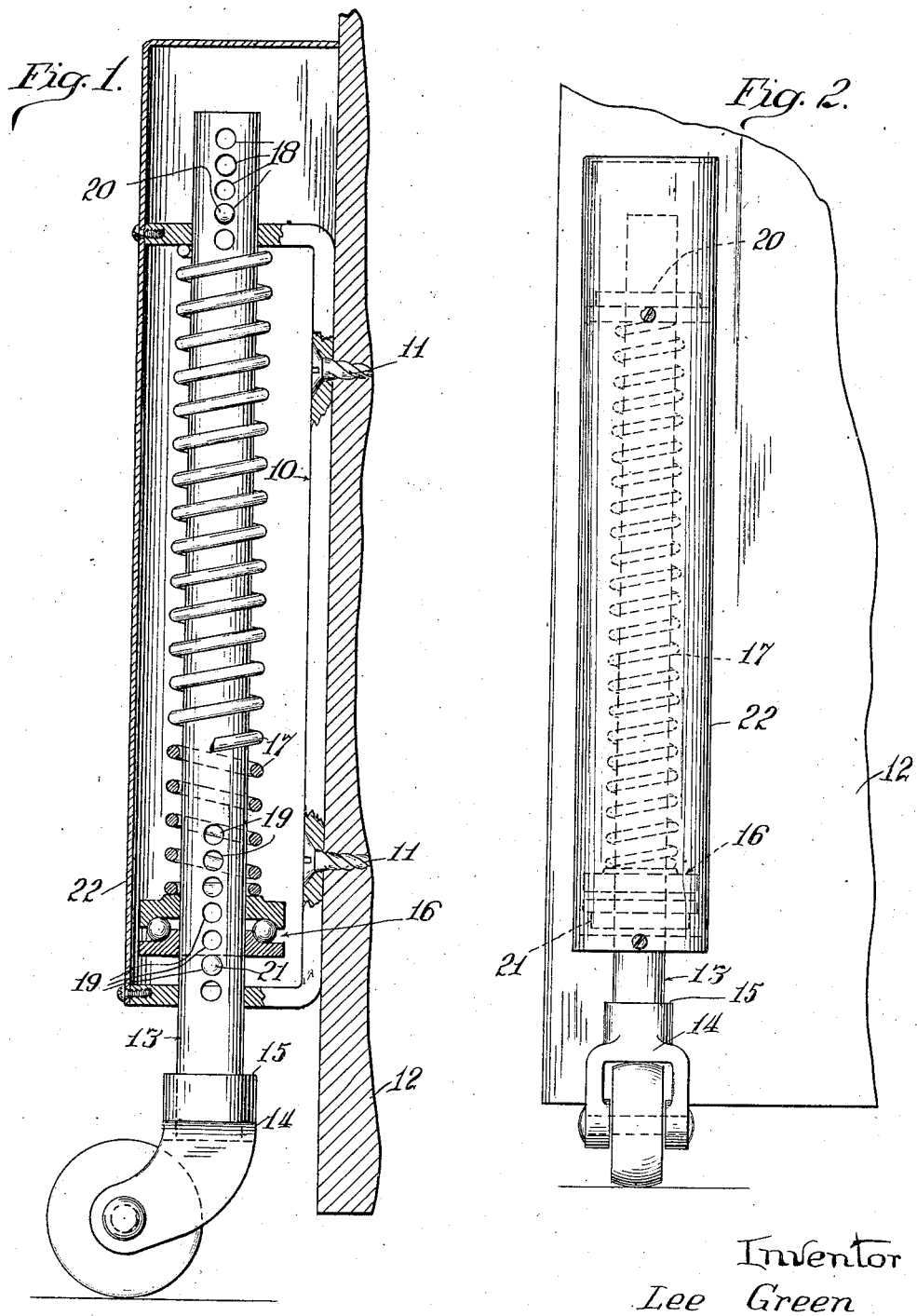
Inventor
Lee Green
By Carl Prover
Attorney Patented Jan. 13, 1931

1,788,391

UNITED STATES PATENT OFFICE

LEE GREEN, OF CHICAGO, ILLINOIS

BALL-BEARING SPRING CASTER

Application filed October 6, 1927. Serial No. 224,377.

The object of my invention is to provide a ball-bearing caster that will carry its load yieldingly and will also adjust itself, in a measure, to variations in the floor level on which it rests. In the form shown in the drawings it is particularly adapted for use on garage doors.

In the drawing, Fig. 1 is a side elevation of my device with the protective cap partially broken away, and Fig. 2 is a front elevation of my device with the protective cap in position.

Referring to the drawing, a metallic frame 10 is firmly attached, by means of set screws 11, to a door 12. In frame 10 is mounted a smooth round metallic rod 13 to the lower end of which there is firmly attached a caster 14, forming with its upper end a shoulder 15 around rod 13. On rod 13 there is also mounted a ball-bearing 16 and a compression spring 17. Rod 13 is provided with a series of horizontal holes 18 near its upper end, and with a series of like holes 19 some distance above its lower end. Cotterpin 20 is inserted into one of holes 18, and cotterpin 21 is inserted into one of holes 19. The purpose of holes 18 is primarily to permit vertical adjustment of my caster with reference to frame 10 and door 12 by placing pin 20 higher or lower. The purpose of holes 19 is primarily to permit adjustment of the tension of spring 17; but by placing pin 21 higher or lower when cotterpin 20 is withdrawn from holes 18, or is placed very high, cotterpin 21 may also serve to limit the downward movement of rod 13 and caster 14. In any event the pressure of spring 17 is transmitted through bearing 16 and cotterpin 21 to rod 13 and caster 14.

For the purpose of protecting my device from the weather, from dust and from accidental injury, I prefer to cover it by a protective cap 22, which may be attached to frame 10 in any suitable manner.

It is manifest that the construction of my device might be deviated from without departing from the essentials of my invention. All such deviations I intend to cover by my claim.

I claim:

In a ball-bearing spring caster, the combination of a bracket adapted to be connected to an object to be supported, and provided with horizontal arms; a vertical shaft slidably entered in openings in said arms and provided with a series of transverse openings near its upper and its lower end; a caster mounted on the lower end of the shaft; a ball bearing slidably mounted on said shaft above the lower arm of the bracket; a compression spring mounted on the shaft between the ball bearing and the upper arm of the bracket; and cotterpins entered in the shaft above the upper arm of the bracket, and below the ball bearing respectively; substantially as and for the purpose described.

LEE GREEN.